UNITED STATES PATENT OFFICE.

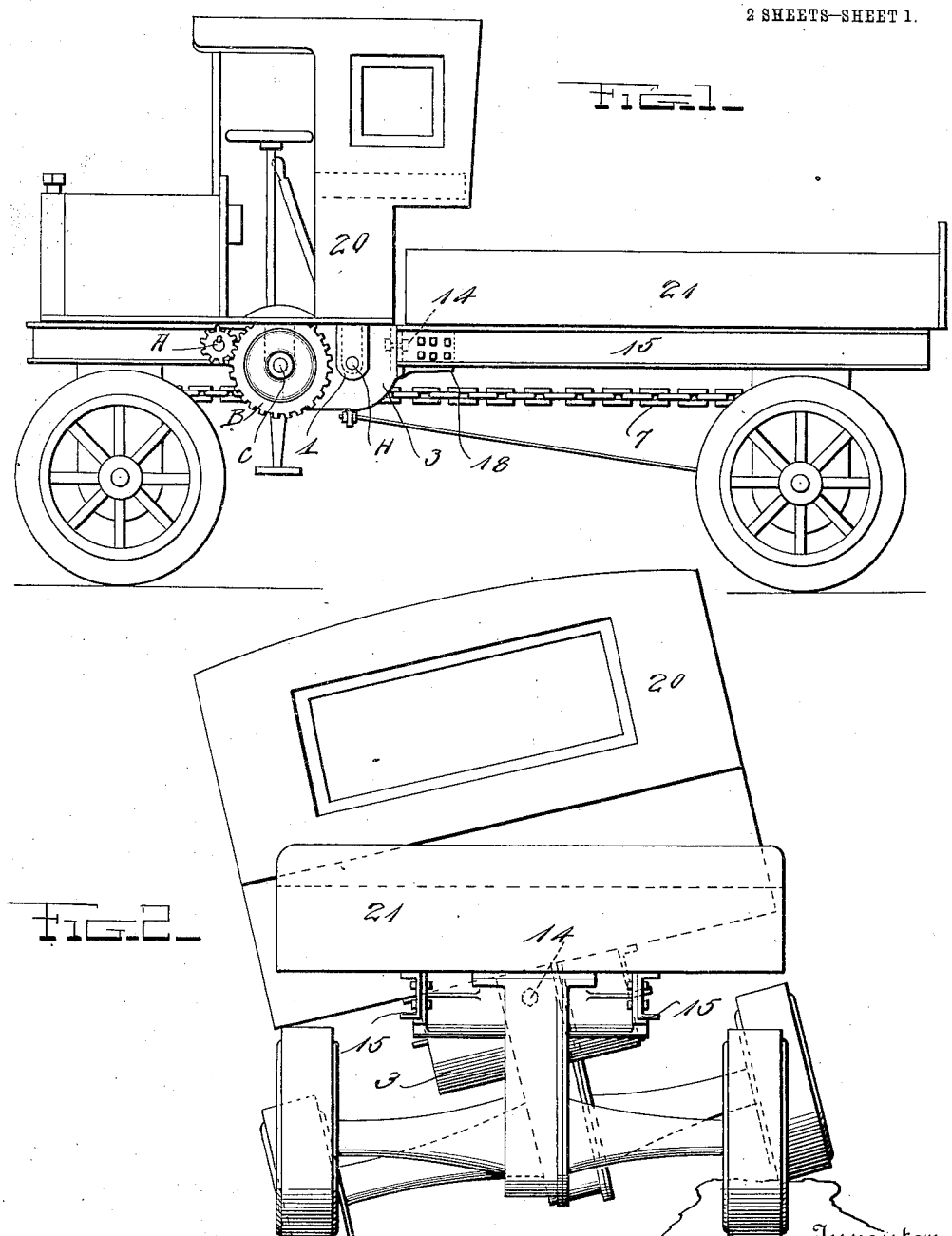

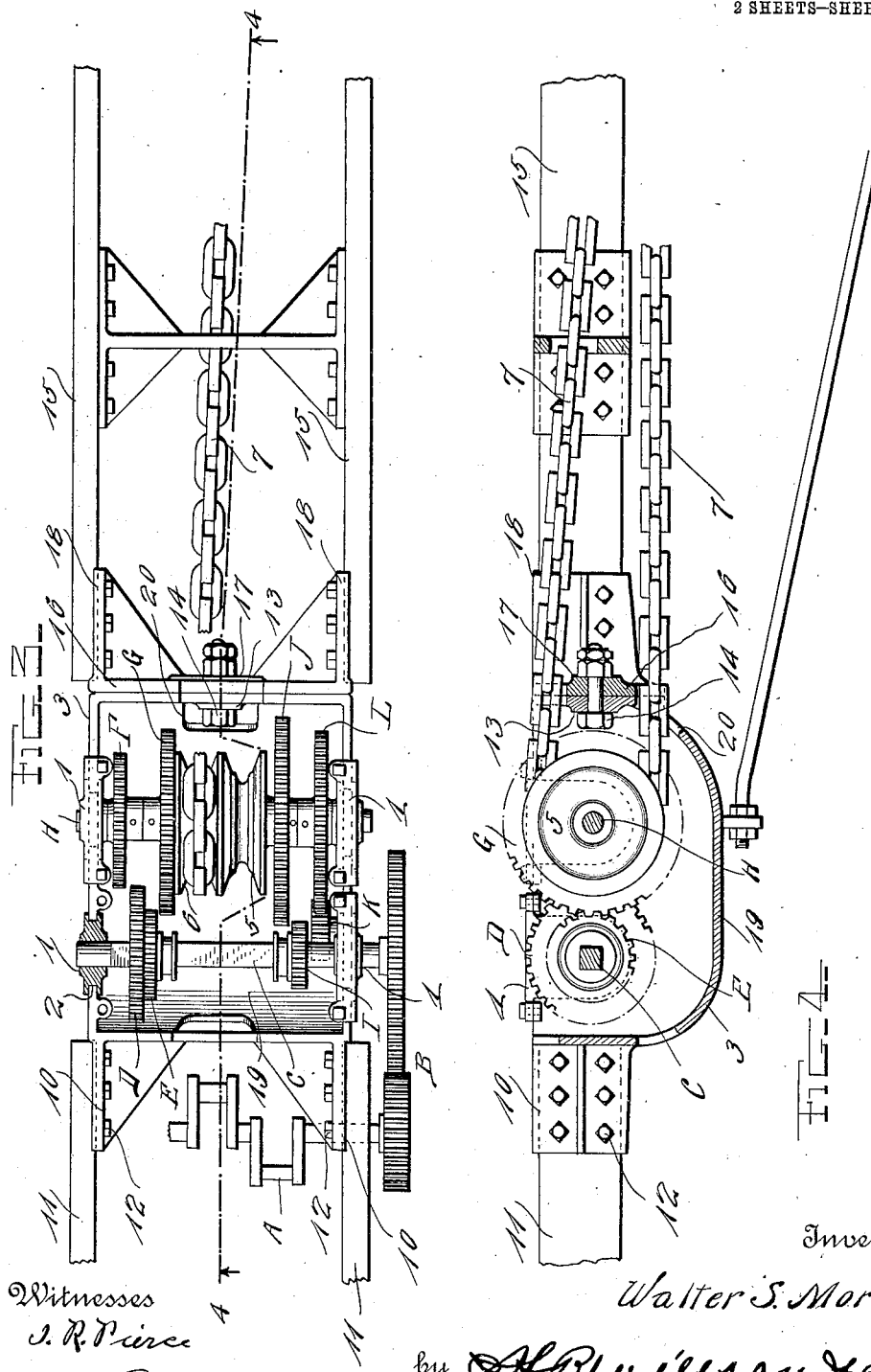

WALTER S. MORTON, OF HARRISBURG, PENNSYLVANIA.

MOTOR-VEHICLE FRAME.

1,062,789.        Specification of Letters Patent.        Patented May 27, 1913.

Application filed March 5, 1912. Serial No. 681,862.

*To all whom it may concern:*

Be it known that I, WALTER S. MORTON, a citizen of the United States, residing at Harrisburg, in the county of Dauphin and State of Pennsylvania, have invented certain new and useful Improvements in Motor-Vehicle Frames; and I do declare the following to be a full, clear, and exact description of the invention, such as will enable others skilled in the art to which it appertains to make and use the same.

This invention relates to motor vehicles, and more especially to the frames thereof; and the object of the same is to make the case for the transmission mechanism an element of the frame itself so that the latter may be narrower or the former wider as the case may be.

A further object is to connect said case with the remainder of the chassis by a torsion pivot located at the transverse center of the vehicle whereby the frame may have a sinuous movement in its passage over obstructions or rough roads without racking the parts as customary.

These and other objects are carried out by the construction described in the following specification and illustrated in the drawings wherein—

Figure 1 is a side elevation of this improved vehicle frame, and Fig. 2 is a rear elevation of the same. Fig. 3 is a plan view of the chassis, with the cover of the transmission case removed, and Fig. 4 is a vertical section on the line 4—4 of Fig. 3.

In the drawings I have conventionally illustrated the frame or chassis of a motor vehicle or tractor such as is driven by a gasolene engine through transmission mechanism, whence chains lead forward and backward to the two axles, although of course it is quite possible to omit one chain and drive but one axle. The details of the transmission mechanism form no part of the present invention, but may be briefly described as follows: Let A designate the crank shaft driven by the gasolene engine (not shown) and geared as at B to the driving shaft C which is here shown as square. Slidably mounted thereon by means (not shown) under control of the driver are two gears D and E which are relatively large and small and adapted to be alternately engaged with other gears F and G which are relatively small and large, the latter being fast on the driven shaft H which may thereby be rotated at high speed or medium speed. Slidable also on said driving shaft C by means not shown but under control of the driver, is a low speed gear I adapted to be moved into mesh with a large gear J which latter is also fast on the driven shaft H; and K is an idle gear mounted loosely in the case and in constant mesh with another gear L on the shaft H, so that when the gear I is moved in the opposite direction a low speed reverse drive may be secured. I do not wish to be confined to this form of transmission mechanism, but have described it merely to show that it consists only of two shafts and the gears thereon, and the shifting mechanism (not shown); but this or a similar form of transmission mechanism is particularly useful in connection with my invention because said shafts may be mounted at both their extremities in journal boxes 1 which latter in turn are removably disposed within notches 2 in the side walls of the casing 3, held therein in any suitable manner, and removable at will. The gears B which connect the crank shaft with the driving shaft are by preference on the outside of the casing at one end thereof, and readily disengaged when the driving shaft is lifted out of place. The driven shaft H may also be lifted out of place with its boxes, and when doing so the gear L will disengage the idle gear K which alone remains within the case 3. Hence it will be seen that, while the transmission mechanism itself may be of any approved type, if it includes but two shafts and the wheels thereon and those shafts extend to the exterior or sides of the case 3 and are mounted in boxes 1 which may be removed or lifted out of same, the parts can be readily withdrawn for cleaning or repair. Furthermore, the disposition of the gears B on the exterior of the case has its advantages; for instance if it be desired to change the speed or power of the engine, it can be accomplished by substituting differently sized intermeshing gears for those lettered B without interrupting or altering the position of either the engine or the transmission mechanism. The driving mechanism in this improved tractor is by preference of the chain type. Fast on the shaft H are two sprocket wheels 5 and 6, around one of which in the present instance is shown a chain 7 leading throughout the length of the frame and adapted to be connected with the axle which it drives in a manner forming no part of the present invention. It will be obvious, also, that another chain could be passed around the other sprocket wheel 5 and led in the opposite direction to the other axle if it be desired to drive this machine from both axles.

The frame of this improved motor vehicle is by preference of a construction which adapts it both to a transmission case and a chain drive as shown. That is to say, one end of the case 3 (the front end in the present instance) has formed upon it integrally projecting lugs or brackets 10 so disposed and shaped that they will receive the channel iron side bars 11 of the front portion or section of the chassis, to which they are riveted or bolted as at 12. The body of the transmission case is approximately as wide as the frame so that when in place there is apparently no interruption to the contour thereof. The other end of the case 3 (the rear end in the present instance) is pierced at its transverse center with an eye surrounded by a reinforcing boss 13, and through these parts passes a torsion pivot bolt 14. The side bars 15 of the rear portion or section of the chassis are connected at their forward extremities by a cross plate 16 also having a central eye and a boss 17 through which said bolt passes, the plate and the side bars being braced by lugs or brackets 18 as shown. This plate and the rear plate of the case 3 are by preference much narrower vertically than the depth of the transmission case 3 or the diameter of the sprocket wheels 5 and 6, in order purposely that the upper and lower reaches of the chain 7 may pass above and below said plates and the torsion pivot between them. The bottom 19 of the case 3 is by preference dished as shown in Fig. 4, with a suitable opening 20 for the lower reach of said chain—the purpose obviously being to cause the case to retain enough oil or grease to lubricate the parts and the chain as it moves around the sprocket wheel. As above suggested, there may be another chain leading in the opposite direction, but this is shown in the present instance only in Fig. 1.

The advantage of a motor vehicle frame constructed as above described, lies in the fact that the case 3 is bolted to and forms a part of one end of the frame and partakes of the sinuous movement thereof as the vehicle passes over obstructions or uneven places in the roadway, while the other end of the frame beyond the torsion pivot 14 partakes of the sinuous movement of the other end of the vehicle irrespective of the movement, if any, of that part of the frame which carries the transmission case. The length of the drive chain from the sprocket wheel to the point where it is connected with the axle is sufficient to permit the same to twist to quite an extent as the two parts of the frame turn with relation to each other around the torsion pivots.

The body employed with a vehicle frame of this construction, if it extends over both parts of the chassis, must be made in two sections whereof that numbered 20 is the cab or the section which contains the driving mechanism, steering mechanism, and seat for the driver, and the other section numbered 21 is the box if the vehicle be intended for freight or perhaps the tonneau if it be a passenger vehicle. At any rate, it is essential that the line of division between the two sections of the body shall occur above the torsion pivot and stand coincident with the line between the cross plate 16 at the front end of the side bars 15 and the cross plate at the rear side of the transmission case 3. Therefore, when the two parts of the chassis move relatively to each other on the torsion pivot, the two sections of the body will of necessity have a corresponding relative movement.

What is claimed as new is:

1. In a motor vehicle, the combination of a body supporting frame made in sections, a transmission mechanism supporting frame interposed between two of said sections, and of substantially the same width as the latter so as to form an element therein and preserve the continuity thereof, and a flexible connection between one of said body supporting frame sections and said transmission mechanism supporting frame.

2. In a motor vehicle, the combination of a body supporting frame made in sections, a transmission mechanism supporting frame interposed between two of said sections and rigidly connected to one of said sections to form a part thereof, and a horizontal longitudinally extending torsion pivot uniting the transmission mechanism supporting frame to the other body supporting frame section.

3. A motor vehicle frame made up of sections including side bars, and a cross bar connecting the extremities of the side bars of one section; combined with a transmission mechanism, a rectangular case therefor which is of substantially the same width as said frame so as to form an element therein and preserve the continuity thereof, a flexible connection between one end of the case and the center of said cross bar, and lugs at the other end of the case rigidly connected with the side bars of the other frame-section.

4. A motor vehicle frame-section including side bars and a cross bar connecting their extremities; combined with a transmission mechanism, a rectangular case inclosing the same and of substantially the same width as said frame so as to form an element therein and preserve the continuity thereof, its bottom being dished, its sides provided with notches and its rear plate resting against said cross bar, a horizontal torsion pivot connecting said plate and cross bar, and bearings for the shafts of said mechanism removably mounted in said notches.

5. In a motor vehicle, the combination with the frame made in two sections, a rectangular case interposed between the adjacent ends of and of substantially the same width as said sections and rigidly connected with the forward section, and a torsion bolt pivotally connecting the case with the rearward section at the transverse center of the frame; of transmission mechanism mounted within said base and including a sprocket wheel and a driving shaft of which one extremity projects to the side of the case, means for connecting the projecting extremity with a source of power, and connections between said sprocket wheel and the running gear of the vehicle.

6. In a motor vehicle, the combination with the frame made in two sections whereof one includes side bars and a narrow upright cross bar connecting their extremities and having a boss at its center, a transmission mechanism, a rectangular case therefor secured at one end to the other frame-section and having its opposite end lying against said cross bar and provided with a boss at its center, this end and the cross bar and both bosses being pierced with registering holes, and a torsion bolt through said holes: of a sprocket wheel driven by said mechanism and of greater diameter than the height of said cross bar or of the rear plate of said case, and a chain leading around said sprocket and with its stretches extending above and below said pivot.

7. In a motor vehicle, the combination of a body supporting frame made in sections, a transmission mechanism including a shaft to extend transversely of the vehicle, a transmission mechanism supporting frame or case interposed between the said sections and of substantially the same width as the latter so as to form an element in the frame and preserve the continuity of the same, said transmission mechanism supporting frame having in its sides bearing receiving notches, bearings for the shaft of said transmission mechanism removably mounted in said notches, and a flexible connection between said transmission mechanism supporting frame and the other body supporting frame section.

8. In a motor vehicle, the combination of a body supporting frame made in two sections, a transverse power shaft mounted in one of said sections, a transmission mechanism including a shaft to extend transversely of the vehicle, a supporting frame for the transmission mechanism interposed between the two body supporting frame sections and rigidly secured to that one containing the power shaft, said transmission mechanism supporting frame having notches in its sides and being substantially the same width as the body supporting frame so as to form an element therein and preserve the continuity thereof, bearings for the transmission mechanism shaft removably mounted in said notches, a flexible connection between said transmission mechanism supporting frame and the other body supporting frame section, and driving means connecting the outer ends of the two shafts substantially as and for the purpose set forth.

9. In a motor vehicle, the combination with the running gear or frame made in two sections, a transmission mechanism supporting frame arranged between the two sections and rigidly secured to one of them, said transmission mechanism supporting frame being of substantially the same width as the body supporting frame so as to form an element therein and preserve the continuity thereof, and a horizontal longitudinally extending pivotal connection between said transmission mechanism supporting frame and the other body supporting frame section; of a vehicle body also made in two sections separated from each other on a transverse plane above said pivotal connection and respectively secured to said frame sections, for the purpose set forth.

10. In a motor vehicle, the combination with the frame made in two sections whereof the rearmost has a cross bar at its front extremity pierced with a central hole, a box-shaped case secured to the foremost frame-section with its rear side in contact with said cross bar and also pierced with a hole, and a torsion pivot through said hole; of a vehicle body also made in sections separated from each other on a line above said pivot, and respectively secured to the frame-sections which they overlie.

In testimony whereof I have hereunto set my hand in presence of two subscribing witnesses.

WALTER S. MORTON.

Witnesses:
A. W. HOSTER,
K. W. WEHLER.